US007029036B2

(12) United States Patent  
Andre

(10) Patent No.: US 7,029,036 B2  
(45) Date of Patent: Apr. 18, 2006

(54) ROTATABLE TWO PART QUICK CONNECTION

(75) Inventor: Michael J. Andre, Waterford, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/796,677

(22) Filed: Mar. 9, 2004

(65) Prior Publication Data

US 2005/0200125 A1 Sep. 15, 2005

(51) Int. Cl.
F16L 37/00 (2006.01)
F16L 37/50 (2006.01)

(52) U.S. Cl. ............... 285/319; 285/305; 285/921
(58) Field of Classification Search .......... 285/305, 285/319, 921, 272, 275, 322
See application file for complete search history.

(56) References Cited

U.S. PATENT DOCUMENTS

| 730,378 | A | 6/1903 | Lambert |
| 1,232,272 | A | 7/1917 | Frazier et al. |
| 1,837,345 | A | 12/1931 | Thomas |
| 1,976,589 | A | 10/1934 | Trickey |
| 3,120,968 | A | 2/1964 | Calvin |
| 3,780,773 | A | 12/1973 | Haugen |
| 4,093,279 | A | 6/1978 | Verdesca et al. |
| 4,136,885 | A | 1/1979 | Uhrner |
| 4,158,407 | A | 6/1979 | Rest |
| 4,193,616 | A | 3/1980 | Sarson et al. |
| 4,376,525 | A | 3/1983 | Fremy |
| 4,423,892 | A | 1/1984 | Bartholomew |
| 4,483,371 | A | 11/1984 | Susin |
| 4,483,543 | A | 11/1984 | Fisher, Jr. et al. |
| 4,601,497 | A | 7/1986 | Bartholomew |
| 4,632,434 | A | 12/1986 | Proctor et al. |
| 4,647,012 | A | 3/1987 | Gartner |
| 4,681,351 | A | 7/1987 | Bartholomew |
| 4,753,458 | A | 6/1988 | Case et al. |
| 4,846,506 | A | 7/1989 | Bocson et al. |
| 4,869,534 | A | 9/1989 | Ketcham et al. |
| 4,915,136 | A | 4/1990 | Bartholomew |
| 5,033,513 | A | 7/1991 | Bartholomew |
| 5,046,763 | A * | 9/1991 | Martucci et al. ............... 285/81 |
| 5,168,902 | A | 12/1992 | Hood |
| 5,195,787 | A | 3/1993 | Bartholomew |
| 5,219,188 | A | 6/1993 | Abe et al. |
| 5,275,443 | A * | 1/1994 | Klinger ..................... 285/82 |
| 5,342,095 | A | 8/1994 | Klinger et al. |
| 5,364,131 | A | 11/1994 | Hartsock et al. |
| 5,395,140 | A | 3/1995 | Wiethorn |
| 5,401,063 | A | 3/1995 | Plosz |
| 5,405,175 | A | 4/1995 | Bonnah et al. |
| 5,472,016 | A | 12/1995 | Szabo |
| 5,492,371 | A | 2/1996 | Szabo |

(Continued)

FOREIGN PATENT DOCUMENTS

EP 1369634 12/2003  
GB 2 077 377 12/1981

Primary Examiner—James M. Hewitt  
(74) Attorney, Agent, or Firm—Young & Basile, P.C.

(57) ABSTRACT

A fluid quick connector includes first and second rotatably, non-axially movably engaged housings. A retainer is mountable in the second housing for lockingly coupling a fluid operative element to the second housing. The first housing has an annular recess at one end which receives a collar extending axially from the second housing. Projections extend radially from the collar and engage the recess in the first housing to rotatably interconnect the first and second housings.

9 Claims, 3 Drawing Sheets

U.S. PATENT DOCUMENTS

| | | | |
|---|---|---|---|
| 5,542,712 A * | 8/1996 | Klinger et al. | 285/93 |
| 5,542,716 A | 8/1996 | Szabo | |
| 5,649,724 A | 7/1997 | Wiethorn | |
| 5,683,117 A | 11/1997 | Corbett et al. | |
| 5,707,084 A | 1/1998 | Szabo | |
| 5,730,481 A | 3/1998 | Szabo et al. | |
| 5,782,502 A | 7/1998 | Lewis | |
| 5,863,077 A | 1/1999 | Szabo et al. | |
| 5,882,048 A | 3/1999 | Kawasaki et al. | |
| 5,924,746 A | 7/1999 | Szabo | |
| 5,951,063 A | 9/1999 | Szabo | |
| 6,142,537 A | 11/2000 | Shimada et al. | |
| 6,155,612 A | 12/2000 | Szabo | |
| 6,173,998 B1 | 1/2001 | Bock | |
| 6,186,561 B1 | 2/2001 | Kaishio et al. | |
| 6,234,544 B1 | 5/2001 | Bartholomew | |
| 6,293,596 B1 | 9/2001 | Kinder | |
| 6,371,529 B1 | 4/2002 | Szabo et al. | |
| 6,431,612 B1 | 8/2002 | Walker et al. | |
| 6,520,546 B1 | 2/2003 | Szabo | |
| 6,834,891 B1 * | 12/2004 | Matsubara et al. | 285/319 |
| 6,846,021 B1 * | 1/2005 | Rohde et al. | 285/81 |
| 6,869,110 B1 * | 3/2005 | Okada et al. | 285/319 |
| 2001/0017469 A1 * | 8/2001 | Sausner et al. | 285/305 |
| 2001/0048225 A1 * | 12/2001 | Andre et al. | 285/305 |
| 2002/0053797 A1 * | 5/2002 | Vierneisel et al. | 285/305 |
| 2002/0079696 A1 * | 6/2002 | Szabo | 285/39 |
| 2002/0084651 A1 * | 7/2002 | Walker et al. | 285/305 |
| 2002/0084652 A1 * | 7/2002 | Halbrock et al. | 285/305 |
| 2004/0094958 A1 * | 5/2004 | Treverton et al. | 285/319 |
| 2004/0189001 A1 * | 9/2004 | Poder | 285/93 |
| 2004/0232693 A1 * | 11/2004 | Legeay | 285/305 |

* cited by examiner

ROTATABLE TWO PART QUICK CONNECTION

BACKGROUND

The present invention relates, in general, to fluid quick connectors which couple fluid carrying components.

Snap-fit or quick connectors are employed in a wide range of applications, particularly, for joining fluid carrying conduits in automotive and industrial application. In a typical quick connector with an axially displaceable retainer, the retainer is fixedly mounted within a bore in a housing of a connector component or element. The retainer has a plurality of radially and angularly extending legs which extend inwardly toward the axial center line of the bore in the housing. A tube or fitting to be sealingly mounted in the bore in the housing includes a radially upset portion or flange which abuts an inner peripheral surface of the retainer legs. Seal and spacer members as well as a bearing or top hat are typically mounted in the bore ahead of the retainer to form a seal between the housing and the fitting when the fitting is lockingly engaged with the retainer legs.

Radially displaceable retainers in which the retainer is radially displaceable through aligned bores or apertures formed transversely to the main through bore in the housing are also known. The radially displaceable retainer is typically provided with a pair of depending legs which are sized and positioned to slip behind the radially upset portion or flange on the fitting only when the fitting or conduit is fully seated in the bore in the connector. This ensures a positive locking engagement of the conduit with the connector as well as providing an indication that the conduit is fully seated since the radially displaceable retainer can be fully inserted into the connector only when the conduit has been fully inserted into the bore in the connector.

Regardless of the type of retainer, the housing of a fluid connector typically includes an elongated stem having one or more annular barbs spaced from a first end. The barbs provide secure engagement with a hose or conduit which is forced over the barbs to connect the housing with one end of the conduit.

Due to the secure engagement between the conduit and the housing, the open end of the axial through bore in the connector portion of a fluid connector designed with an axially displaceable retainer or the transverse bores in a connector designed to receive a radially displaceable retainer are fixed in one circumferential position depending upon the position of the tubing and the connector when the conduit and the connector are joined together. In certain applications, this could limit accessibility to and make it difficult to insert the retainer into the connector, particularly in the case of a radial retainer. Interference with surrounding components frequently makes access to the quick connector for both locking or unlocking operations difficult, if not impossible.

To address these problems, two part fluid quick connectors which are easily rotatable over 360° to facilitate insertion or removal of the retainer into or out of the quick connector have been devised. In such quick connectors, the quick connector housing, typically of one piece construction, is replaced with two engagable portions, one attachable to or mountable on a fluid component, such as a tube or conduit, and the other receiving a second conduit or endform as well as receiving the retainer for locking the first component and the endform together.

Thus, it would be desirable to provide a rotatable two piece quick connector which provides the known advantages of two part rotatable quick connectors with two part fluid quick connector housings.

SUMMARY

The present invention is a fluid quick connector for joining first and second conduits in fluid flow communication. The quick connector includes seal means mounted in the through bore of a first housing for sealing engagement with a second conduit, a second housing having a bore for receiving the second conduit therethrough, and a retainer mountable in the second housing for lockingly coupling the second conduit to the second housing. The first housing has an annular recess spaced from a first end and opening to the through bore to define a radially inturned lip at the first end. A plurality of separate latch fingers extending axially from one end of the second housing each having a radially outward extending projection defining an adjacent recess. The lip of the first housing is engagable in the recess on the second housing to axially connect the first and second housings to each other while permitting rotational displacement of the first and second housings relative to each other. A collar extends axially from the projection on each latch finger. The collar retains the seal means in the first housing when the first and second housing are joined together.

In one aspect, the collar is formed as an axial extension of a plurality of discrete, bendable latch fingers. A radially outward extending projection is formed on each latch finger. Each projection defines an arcuate recess with an adjacent spaced portion of the second housing for rotatably receiving the lip on the first housing.

In another aspect, an annular recess is formed in the second housing and opening to the transverse bore in the second housing. The annular recess receives an enlarged flange on the second conduit when the retainer is moved to the latch position in the second housing.

A rotatable two part fluid quick connector of the present invention provides all the advantages of a fluid quick connector with a latchable retainer while at the same time allowing the two quick connector housings to rotate relative to each other to simplify installation and to be used in many diverse applications having different space requirements.

BRIEF DESCRIPTION OF THE DRAWING

The various features, advantages and other uses of the present invention will become more apparent by referring to the following detailed description and drawing in which.

DETAILED DESCRIPTION

Figure 1:
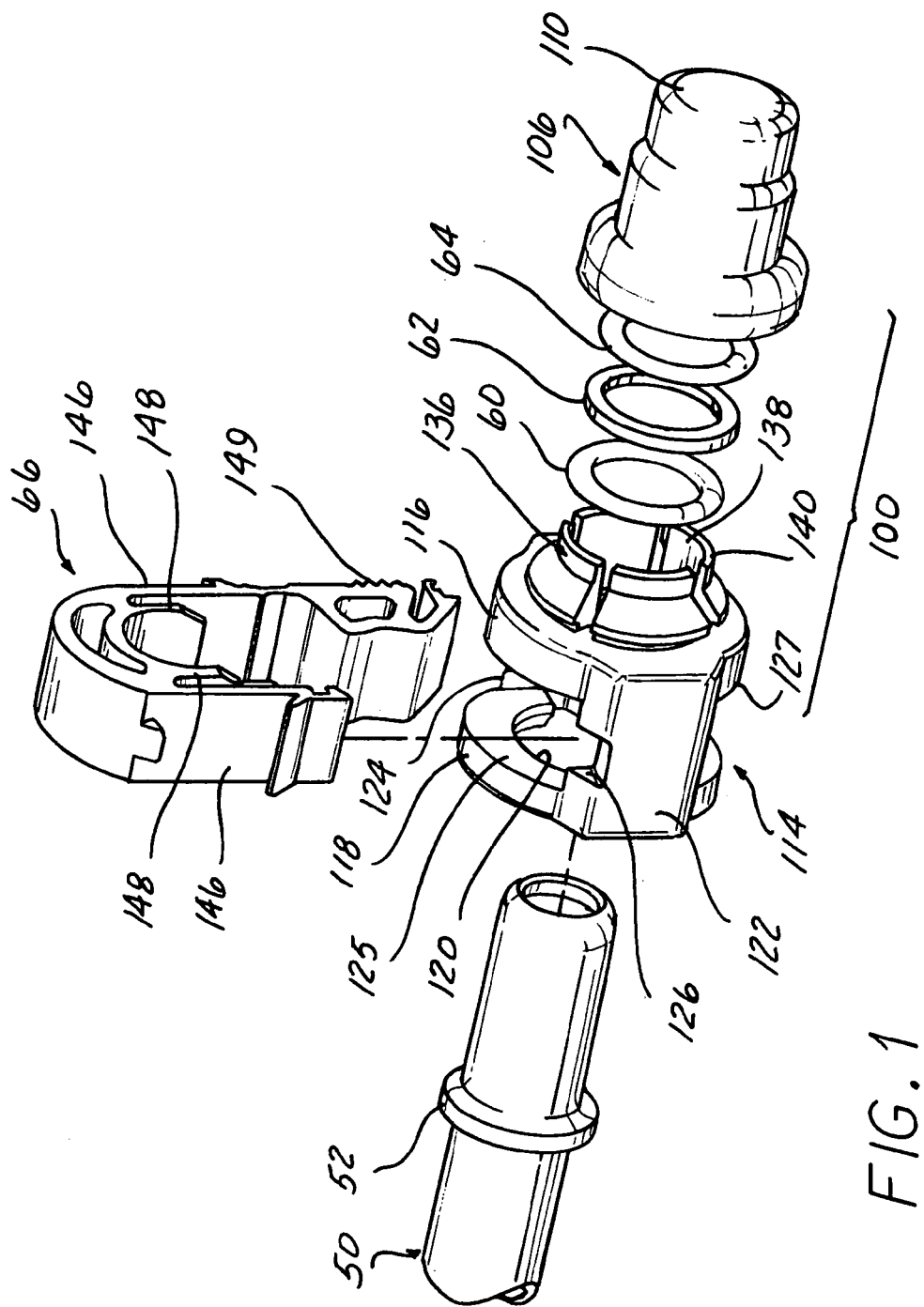
FIG. 1 is an exploded perspective view of a rotatable quick connector according to the present invention.
Figure 2:
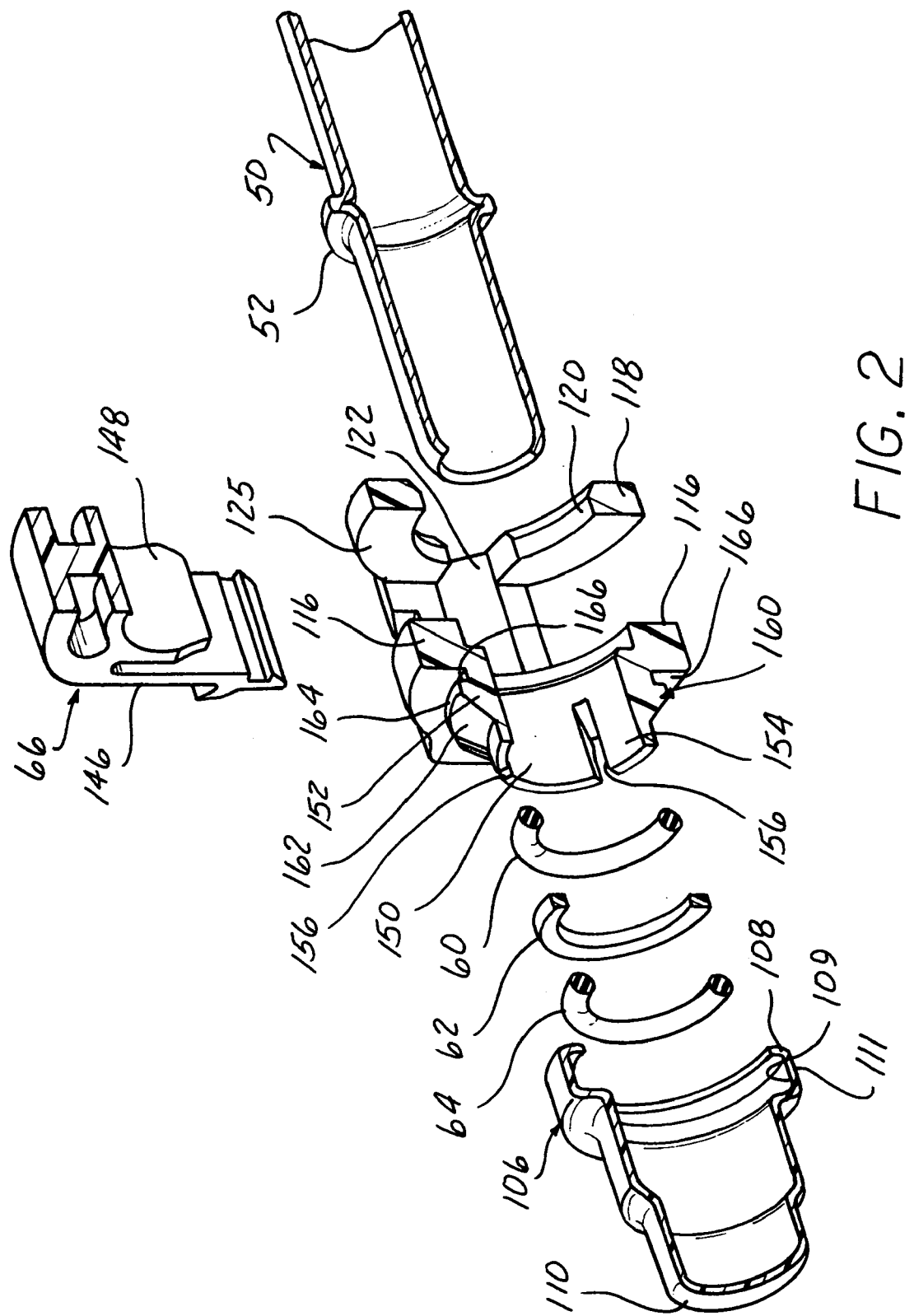
FIG. 2 is an exploded, perspective, longitudinal cross-sectional view of quick connector shown in FIG. 1.
Figure 3:
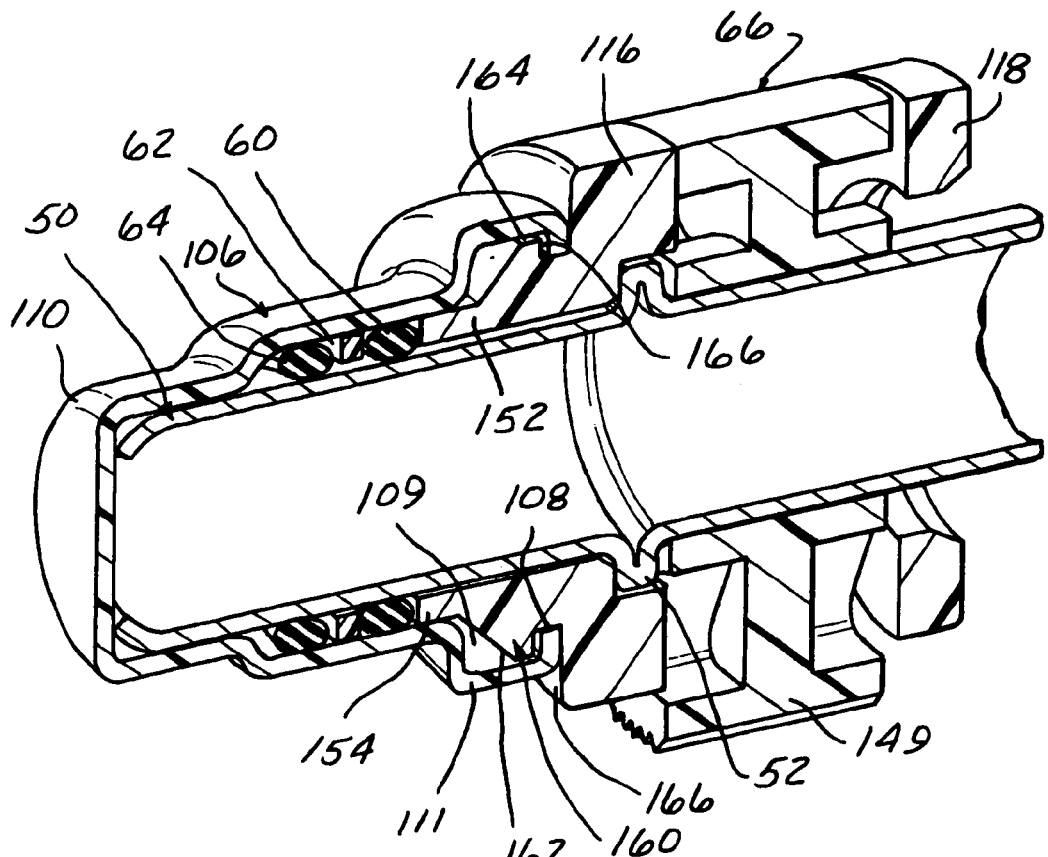
FIG. 3 is a perspective, longitudinal cross-sectional view of the assembled quick connector of FIGS. 1 and 2 shown in an assembled state.

Referring now to FIGS. 1–4 of the drawing, there is depicted a fluid quick connector and, more particularly, a fluid quick connector having two rotatable components, one receiving a retainer and a second mountable to or carried on a separate fluid component, such as a tubular conduit described by example only hereafter.

Referring to FIGS. 1 to 4, there is depicted one aspect of a rotatable two piece fluid quick connector 100 of the present invention.

The fluid quick connector 100 is adapted for sealingly and lockingly, yet removably interconnecting first and second fluid members, such as conduits, in a fluid tight, leak proof, sealed connection by a snap together arrangement.

The quick connector includes a housing assembly 102 formed of the first housing 106 and a second housing 114 which are adapted to be axially connected to provide an axially extending through bore between opposite ends.

Figure 4:
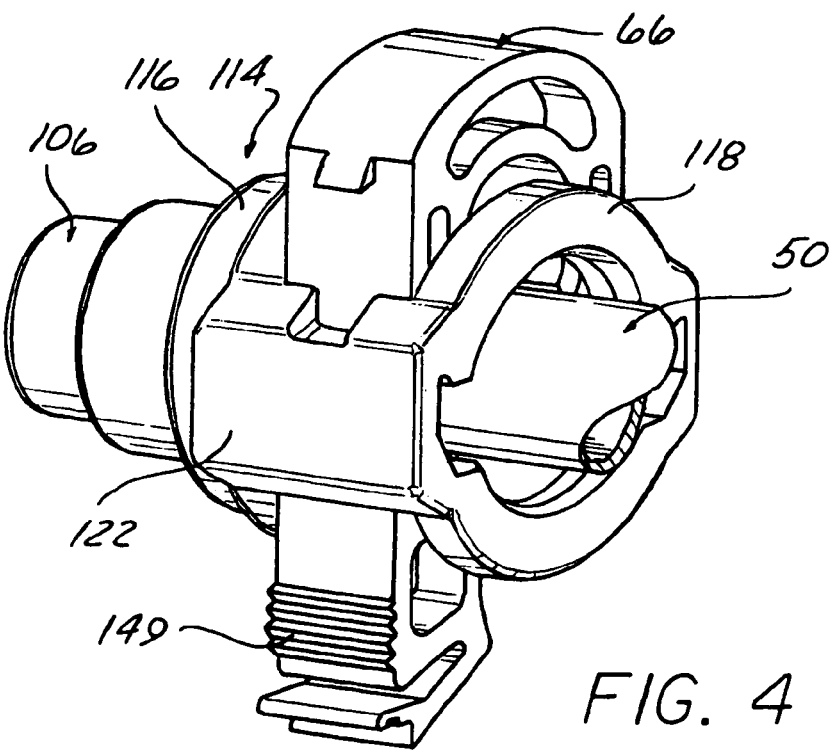
FIG. 4 is a perspective view of quick connector of the present invention in the assembled state.

The first housing 106 can be formed as an integral extension of a fluid operative device, such as a manifold, valve, etc., or as shown in FIGS. 1 and 4, of a one piece body, preferably of a high strength plastic or metal, having a stepped exterior surface housing extending from a lip 108 at one end to an opposed second end 110. At least one and, preferably, a plurality of longitudinally spaced barbs or projections not shown, may be formed along the exterior of the first housing 106 adjacent the second end 110 for secure engagement with a flexible conduit, such as a plastic or elastomer conduit, which is slidably urged thereover into sealed connection with the barbs. An annular groove or recess 109 is formed in an enlarged portion 111 in the first housing 106 adjacent the lip 108, the purpose of which will be described hereafter.

The second housing 114 is also preferably formed of a one piece, integral, unitary body, also of a high strength plastic. The second housing 114 includes first and second annular ring members 116 and 118, respectively. The first and second ring members 116 and 118 are spaced apart and interconnected by a pair of side flanges 122 which extend between peripheral edges of the first and second ring members 116 and 118. A notch 126 is formed along one side edge of each of the side flanges 122 and 124 for receiving an interconnecting projection in the retainer 66, as described hereafter.

Preferably, the side flanges 122 and 124 are parallel to each other and, in conjunction with the first and second ring members 116 and 118, define transversely opening apertures 125 and 127. The transversely extending apertures 125 and 127 communicate with a through bore which extends longitudinally through the second housing 114 from a first aperture 120 within the second ring member 118 to an aperture or bore 138 extending through a tubular extension or collar 136 projecting from the first ring member 116 and terminating in a first outer end 140. The collar 136 serves as a top hat to retain the seal elements 60, 62 and 64 in the bore in the first housing 106.

The quick connector 100 further includes the generally U-shaped retainer 66 adapted to be received in the transverse apertures 125 and 127 in the second housing 114 such that spaced legs 146 of the retainer 66 will pass along either side of an exposed section of a tube or conduit 50 as the retainer 66 is inserted leg-first into the second housing 114.

Each leg 146 includes an inner arm 148 which defines a "locking" surface adapted to axially oppose and preferably, axially engage one side of the upset bead or flange 52 of the tube 50 when the retainer 66 is fully inserted in the second housing 114. In this manner, the locking surface on each retainer leg serves to prevent axial displacement of the upset bead 52 from the axial bore of the housing 102 beyond a predetermined point, thereby locking the conduit therein.

The retainer 66 also includes a secondary latch 149 as described in U.S. Pat. No. 5,782,502, the contents of which are incorporated herein in its entirety with respect to the description of the structure and operation of the retainer 66.

It will also be understood that the first and second housings 106 and 114 of the connector 102 of the present invention may be used with other types of radially displaceable retainers shown in U.S. Pat. Nos. 5,542,716, 5,951,063 and 5,782,502.

Further, the swivel connection between two portions of the connector 100 can also be applied to quick connectors having axially displaceable retainers as shown in U.S. Pat. Nos. 5,542,712 and 5,542,500.

As is conventional, the side flanges 122 and 124 in the second housing 114 include a pair of centralized, axially-extending, inward opening notches, not shown in side flange 124, while the retainer 66 includes a catch means, such as a ramped external projection or retention barb extending outwardly on each leg. The longitudinal notches cooperate with the retention barbs to releasably secure the retainer 66 in a partially-inserted, "pre-assembly" or "shipping" position within the second housing 114.

In this manner, the retainer 66 can be retained with the second housing 114 while otherwise permitting axial passage of the upset bead into the bore past the very same locking surfaces on the retainer legs that will later prevent axial displacement of the upset bead upon full insertion of retainer 66 into the second housing 114.

A collar 136 includes a plurality of flexible or bendable legs, with four legs 150, 152, 154, and 155 being shown in FIGS. 1–4 by example. The legs 150, 152, 154 and 155 each have a generally arcuate shape and form a discontinuous circular shape for the collar 136. Two adjacent legs, such as legs 150 and 152 or legs 150 and 154, are separated by slots 156 which allow bending of each leg 150, 152, 154 and 155 during connection of the first and second housings 106 and 114.

The first and second housings 106 and 114 are swivelably and rotatably connected to each other by at least one and preferably a plurality of locking projections or fingers 160 which extend radially outward from the collar portion of the legs 150, 152, 154 and 155. Each projection 160 has a tapered or angled ramp surface 162 extending from the end portion of each leg 150, 152, 154 and 155. The ramp portion 162 terminates in a radially outer edge 164 which is disposed adjacent to an annular recess 166 formed between each projection 160 and the adjacent annular ring 116 of the second housing 114

During engagement of the first and second housings 106 and 114, the axially extending end portion of each leg 150, 152, 154 and 155 passes freely through the open end of the bore in the first housing 106 inward of the lip 108.

The ramp surfaces 160 then engage the lip 108 and cause radially inward bending of each leg 150, 152, 154 and 155 until the top edge 164 of each leg 150, 152, 154 and 155 clears the radially inner edge of the lip 108 and brings the lip 108 into engagement with the adjacent recess 166. Each of the legs 150, 152, 154 and 155 then snaps radially outward.

In the interconnected position, the projections 160 lock the first and second housings 106 and 114 together against axial movement while still being rotatable within the enlarged end portion 111 of the first housing 106.

The lip 108 also assists in non-axially joining the first and second housings 106 and 114 while providing a rotatable surface for rotational movement of the first and second housings 106 and 114 relative to each other.

What is claimed is:

1. A fluid quick connector for joining first and second fluid operative elements in fluid flow communication, the quick connector comprising:
- a first housing having a through bore, the first housing adapted to be fluidically coupled to a first fluid operative element;
- seal means mounted in the through bore of the first housing for sealing engagement with a second fluid operative element inserted into the bore;
- a second housing having a bore for receiving the second element therethrough;
- a retainer mountable in the second housing for lockingly coupling the second element to the second housing;
- the first housing having an annular recess spaced from a first end of the first housing and opening to the through bore, the recess defining a radially inturned lip at the first end;
- a plurality of separate latch fingers extending axially from one end of the second housing, each having a radially outward extending projection defining an adjacent recess;
- the lip of the first housing engagable in the recesses on the second housing and the projections on the latch fingers engaging the recess in the first housing to connect the first and second housings to each other while permitting rotational displacement of the first and second housings relative to each other; and
- a collar extending axially from the projection on each latch finger, the collars retaining the seal means in the first housing when the first and second housings are joined together.

2. The quick connector of claim 1 wherein:
the projections on the plurality of latch fingers define a discontinuous annular surface.

3. The quick connector of claim 1 wherein:
the collars on the plurality of latch fingers define a discontinuous annular surface.

4. The quick connector of claim 1 wherein:
each collar is formed axially coextensively with one of the latch fingers.

5. The quick connector of claim 1 wherein:
the first housing has an enlarged portion at the first end, the recess and the lip formed in the enlarged portion.

6. The quick connector of claim 1 wherein the second housing further comprises:
a transverse bore for receiving the retainer.

7. The quick connector of claim 6 further comprising:
an annular recess formed in the second housing opening to the transverse bore, the annular recess receiving an enlarged flange on the second element when the retainer is in a latched position in the second housing.

8. The quick connector of claim 1 wherein the plurality of latch fingers are bendably formed on the second housing.

9. The quick connector of claim 8 wherein each of the latch fingers further comprises:
a ramp surface operatively engagable with the lip on the first housing to effect bending of the latch fingers.

* * * * *